(12) United States Patent
McDade

(10) Patent No.: US 12,031,041 B2
(45) Date of Patent: *Jul. 9, 2024

(54) COMPOSITIONS AND METHODS FOR REDUCING THE AMOUNT OF ASPHALT EMULSION NEEDED FOR RECYCLING AND STABILIZING ROADWAY MATERIALS

(71) Applicant: Billy Shane McDade, Austin, TX (US)

(72) Inventor: Billy Shane McDade, Austin, TX (US)

(73) Assignee: Texas Road Recyclers, LLC, Austin, TX (US)

( * ) Notice: Subject to any disclaimer, the term of this patent is extended or adjusted under 35 U.S.C. 154(b) by 483 days.

This patent is subject to a terminal disclaimer.

(21) Appl. No.: 17/154,991

(22) Filed: Jan. 21, 2021

(65) Prior Publication Data

US 2021/0139706 A1 May 13, 2021

Related U.S. Application Data

(63) Continuation-in-part of application No. 15/331,903, filed on Oct. 23, 2016, now Pat. No. 11,512,437.

(Continued)

(51) Int. Cl.
*C08L 95/00* (2006.01)
*C04B 26/26* (2006.01)
*E01C 7/18* (2006.01)

(52) U.S. Cl.
CPC ............ *C08L 95/00* (2013.01); *C04B 26/26* (2013.01); *C08L 95/005* (2013.01); *E01C 7/18* (2013.01)

(58) Field of Classification Search
CPC .................................................. C08L 95/005
See application file for complete search history.

(56) References Cited

U.S. PATENT DOCUMENTS 3,162,101 A * 12/1964 Rostler ............... C10C 3/00
208/22
3,344,056 A ‡ 9/1967 Rostler ............... C10C 3/00
106/277

(Continued)

OTHER PUBLICATIONS

"Geotechnical Aspects of Pavements Reference Manual" Appendix F: Determination of Admixture Content for Subgrade Stabilization. Bridges and Structures Federal Highway Administration. NHI-05-037. Oct. 25, 1994 (Year: 1994).‡

(Continued)

*Primary Examiner* — Alexandra M Moore
(74) *Attorney, Agent, or Firm* — Buchanan Ingersoll & Rooney PC

(57) ABSTRACT

A method involving either: determining a first amount of asphalt emulsion required to generate a mixture for roadway material so that the roadway material will exhibit a predetermined strength; or adding a first amount of asphalt emulsion to a road base material to generate a mixture for roadway material and determining a strength of the mixture. The method involves determining an amount of maltene compounds to be mixed with a second amount of asphalt emulsion so that a mixture of the second amount of asphalt emulsion and the amount of maltene compounds used to generate roadway material will exhibit the predetermined strength or the strength, the second amount of asphalt emulsion being less than the first amount of asphalt emulsion. The method involves generating a mixture including the second amount of asphalt emulsion, the amount of maltene compounds, and the road base material.

4 Claims, 2 Drawing Sheets

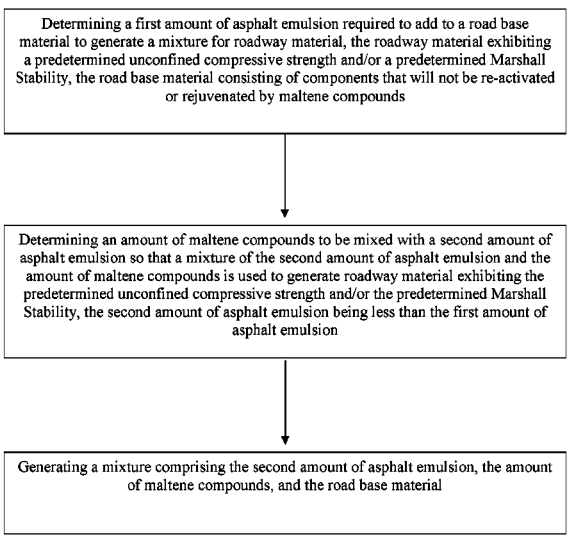

Related U.S. Application Data

(60) Provisional application No. 62/245,973, filed on Oct. 23, 2015.

(56) References Cited

U.S. PATENT DOCUMENTS

| | | | | | |
|---|---|---|---|---|---|
| 3,825,513 | A | ‡ | 7/1974 | Rostler | C08J 3/03 524/60 |
| 4,021,393 | A | ‡ | 5/1977 | McDonald | C08L 95/00 106/273.1 |
| 5,811,477 | A | ‡ | 9/1998 | Burris | C08L 95/00 521/41 |
| 7,357,597 | B2 | ‡ | 4/2008 | Face, III | E01C 19/42 404/118 |
| 2013/0195552 | A1 | ‡ | 8/2013 | McDade | E01C 7/187 404/75 |

OTHER PUBLICATIONS

Utilization of Recycled Asphalt in Cold Mixes and Cold In-Place Recycling Processes Guidelines Aug. 2012. https://suma.org/img/uploads/documents/communities_of_tomorrow/Cold%20Mix%20Guidelines.pdf (Year: 2012).‡

\* cited by examiner
‡ imported from a related application

```
┌─────────────────────────────────────────────────────────────────────┐
│   Determining a first amount of asphalt emulsion required to add to a road base  │
│ material to generate a mixture for roadway material, the roadway material exhibiting │
│  a predetermined unconfined compressive strength and/or a predetermined Marshall  │
│  Stability, the road base material consisting of components that will not be re-activated │
│                   or rejuvenated by maltene compounds                │
└─────────────────────────────────────────────────────────────────────┘
```

```
┌─────────────────────────────────────────────────────────────────────┐
│  Determining an amount of maltene compounds to be mixed with a second amount of   │
│   asphalt emulsion so that a mixture of the second amount of asphalt emulsion and the │
│    amount of maltene compounds is used to generate roadway material exhibiting the │
│    predetermined unconfined compressive strength and/or the predetermined Marshall │
│    Stability, the second amount of asphalt emulsion being less than the first amount of │
│                              asphalt emulsion                        │
└─────────────────────────────────────────────────────────────────────┘
```

```
┌─────────────────────────────────────────────────────────────────────┐
│   Generating a mixture comprising the second amount of asphalt emulsion, the amount │
│              of maltene compounds, and the road base material        │
└─────────────────────────────────────────────────────────────────────┘
```

FIG. 1

Determining a first amount of asphalt emulsion required to add to a road base material to generate a mixture for roadway material, the roadway material exhibiting a predetermined unconfined compressive strength and/or Marshall Stability, the road base material comprising components that will be re-activated or rejuvenated by maltene compounds

Determining an amount of maltene compounds to be mixed with a second amount of asphalt emulsion so that a mixture of the second amount of asphalt emulsion and the amount of maltene compounds is used to generate roadway material exhibiting the predetermined unconfined compressive strength and/or Marshall Stability, wherein the amount of maltene compounds also re-activates or rejuvenates the road base components, and wherein the second amount of asphalt emulsion is less equal to or slightly less than the first amount of asphalt emulsion

Determining an amount of maltene compounds to be mixed with a third amount of asphalt emulsion, such that the added maltene compounds are greater than the amount of maltene compounds for the second amount of asphalt emulsion. The amount of maltene compounds for the second amount of asphalt emulsion is used only for rejuvenation purposes. The third amount of asphalt emulsion needed to mix with the roadway material and produce required strengths is reduced from that of the second amount of asphalt emulsion, as the added maltene compounds for the third amount of asphalt emulsion are producing a "High Yield Effect", rather than just rejuvenating existing asphalt in the roadway material

Generating a mixture comprising the third amount of asphalt emulsion, the amount of maltene compounds for the third amount of asphalt emulsion, and the base road material

FIG. 2

COMPOSITIONS AND METHODS FOR REDUCING THE AMOUNT OF ASPHALT EMULSION NEEDED FOR RECYCLING AND STABILIZING ROADWAY MATERIALS

CROSS-REFERENCE TO RELATED APPLICATIONS

This application is a continuation in part application to U.S. application Ser. No. 15/331,903, which claims the benefit under Title 35 United States Code § 119(e) of U.S. Provisional Patent Application Ser. No. 62/245,973; Filed: Oct. 23, 2015, the full disclosure of each is incorporated herein by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATING-BY-REFERENCE OF MATERIAL SUBMITTED ON A COMPACT DISC

Not applicable.

SEQUENCE LISTING

Not applicable.

FIELD OF THE INVENTION

The present disclosure generally relates to formulations for, and methods of recycling and stabilizing roadway materials. More specifically, the present invention generally relates to formulations for, and methods of making and using roadway materials through the use of an additive for reducing the amount of asphalt emulsion needed compared to existing methods and compositions known in the art for recycling and stabilizing roadway materials to achieve equal or improved production, quality, and performance of said recycled and stabilized roadway materials.

BACKGROUND OF THE INVENTION

Without limiting the scope of the disclosed formulations and methods, the background is described in connection with novel formulations and methods of making and using roadway materials through the use of an additive for reducing the amount of emulsion needed compared to existing methods and compositions known in the art for recycling and stabilizing roadway materials to achieve equal or improved production, quality, and performance of said recycled and stabilized roadway materials.

It is an object of the invention to provide alternative formulations and methods of recycling and stabilizing roadway materials with equal or improved performance and quality than conventional methods currently being used for recycling and stabilizing roadway materials while using less asphalt emulsion.

Maltenes by definition are the oily, resinous component of asphalt that remains when the asphaltenes are removed. In addition, maltenes have been described to constitute the fraction of asphalt, which is soluble in n-alkane solvent such as pentane or heptane. Maltenes are known in the art. Maltenes are the chemical fractions of asphalt (derived from crude oil) that make asphalt lively, that is, give it flexibility and moisture resistance. Old, cracked asphaltic paving material is often said to be oxidized, which is the process of maltene loss.

Maltenes may be isolated from the larger asphalt structure during refining, and have been for many years. These maltenes are sold commercially, typically as a roadway surface treatment to retard oxidation or as an additive to liquid asphalt binder ("asphalt cement") used to soften the asphalt cement, or as a rejuvenating agent to partially restore certain properties to oxidized asphalt in reclaimed asphalt pavement (RAP). They are often emulsified before sale and sold under brand names such as "Reclamite". In non-emulsified form they are sold under brand names such as "Reclamite-B" or "Hydrolene".

The amount of asphalt emulsion utilized in the recycling and stabilizing of roadway materials is a considerable cost in the process. A reduction in the amount of asphalt emulsion required in this process improves the cost effectiveness. Current approaches concentrate on the appropriate type and amount of asphalt emulsion needed to perform a specific recycling or stabilization process, but not on specifically reducing the amount of emulsion required. By lowering the amount of asphalt emulsion required, the cost of roadway construction is drastically reduced. In addition, the environmental impact is reduced by lowering the amount of emulsion that must be transported typically by tankers and tractor trailers. This reduces the amount of fossil fuels burned.

What is desired, therefore, is a formulation and method of making and using roadway materials through the use of an additive for reducing the amount of asphalt emulsion needed compared to existing methods and compositions known in the art for recycling and stabilizing roadway materials to achieve equal or improved production, quality, and performance of said recycled and stabilized roadway materials.

The information included in this background section of the specification is included for technical reference purposes only and is not to be regarded as subject matter by which the scope of the description is to be bound or as an admission of prior art.

BRIEF SUMMARY OF THE INVENTION

Accordingly, it is an object of the present invention to provide alternative formulations and methods of recycling and stabilizing roadway materials with equal or improved performance and quality than conventional methods currently being used for recycling and stabilizing roadway materials while using less asphalt emulsion.

In summary, the present invention discloses novel formulations/compositions and methods of making and using roadway materials through the use of maltenes having the effect of lowering the amount of asphalt emulsion needed to achieve the required strength. The use of added maltenes to various commodity emulsions has the effect of lowering the overall amount of asphalt emulsion needed to achieve the desired material strength.

The addition of maltenes to lower the needed asphalt emulsion content is applicable whether the asphalt emulsion is being used to recycle/reclaim 100% reclaimed asphalt pavement (RAP), 100% base, or a mixture of the two.

In an exemplary embodiment, a method of using maltene compounds involves determining a first amount of asphalt emulsion required to add to a road base material to generate a mixture for roadway material so that the roadway material will exhibit a predetermined unconfined compressive strength and/or a predetermined Marshall Stability, the road base material consisting of components that will not be re-activated or rejuvenated by maltene compounds. The method involves determining an amount of maltene compounds to be mixed with a second amount of asphalt emulsion so that a mixture of the second amount of asphalt emulsion and the amount of maltene compounds used to generate roadway material will exhibit the predetermined unconfined compressive strength and/or the predetermined Marshall Stability, the second amount of asphalt emulsion being less than the first amount of asphalt emulsion. The method involves generating a mixture comprising the second amount of asphalt emulsion, the amount of maltene compounds, and the road base material.

In some embodiments, the second amount of asphalt emulsion is within a range from 40% to 70% less than the first asphalt emulsion amount.

In some embodiments, the second amount of asphalt emulsion is 3.00% or less by weight of the roadway material. The maltene compounds are at least 3.00% by weight of the amount of stock asphalt in the second asphalt emulsion. The predetermined unconfined compressive strength of the roadway material composition with the second amount of asphalt emulsion is at least 150 pounds per square inch.

In an exemplary embodiment, a method of using maltene compounds involves determining a first amount of asphalt emulsion required to add to a road base material to generate a mixture for roadway material, the roadway material exhibiting a predetermined unconfined compressive strength and/or a predetermined Marshall Stability, the road base material comprising components that will be re-activated or rejuvenated by maltene compounds. The method involves determining an amount of maltene compounds to be mixed with a second amount of asphalt emulsion so that a mixture of the second amount of asphalt emulsion and the amount of maltene compounds is used to generate roadway material exhibiting the predetermined unconfined compressive strength and/or the predetermined Marshall Stability, wherein the amount of maltene compounds also re-activates or rejuvenates the road base components, and wherein the second amount of asphalt emulsion is less equal to or slightly less than the first amount of asphalt emulsion. The method involves determining an amount of maltene compounds to be mixed with a third amount of asphalt emulsion, such that the added maltene compounds are greater than the amount of maltene compounds for the second amount of asphalt emulsion. The amount of maltene compounds for the second amount of asphalt emulsion is used only for rejuvenation purposes. The third amount of asphalt emulsion needed to mix with the roadway material and produce required strengths is reduced from that of the second amount of asphalt emulsion, as the added maltene compounds for the third amount of asphalt emulsion are producing a "High Yield Effect", rather than just rejuvenating existing asphalt in the roadway material. The method involves generating a mixture comprising the third amount of asphalt emulsion, the amount of maltene compounds for the third amount of asphalt emulsion, and the base road material.

In some embodiments, the third amount of asphalt emulsion is within a range from 40% to 70% less than the first amount of asphalt emulsion.

In some embodiments, the third amount of asphalt emulsion is 2.50% or less by weight of the roadway material composition. The maltene compounds added to the third amount of asphalt emulsion are at least 6.00% by weight of an amount of asphalt stock in the first amount of asphalt emulsion. The predetermined unconfined compressive strength of the roadway material composition with the second amount of asphalt emulsion is at least 150 pounds per square inch.

In some embodiments, the maltene compounds are 6.00% or greater by weight of the third amount of asphalt emulsion.

In some embodiments, the maltene compounds are within a range from 5.00% to 8.00% by weight of the third amount of asphalt emulsion.

In an exemplary embodiment, a roadway material includes road base material, maltene compounds, and asphalt emulsion. When the road base material consists of components that do not require re-activation or rejuvenation, the maltene compounds are added to the asphalt emulsion to reduce an amount of asphalt emulsion otherwise required to achieve a predetermined unconfined compressive strength and/or a predetermined Marshall Stability for the roadway material for the roadway material. When the road base material comprises components that require re-activation or rejuvenation, the maltene compounds are added to the asphalt emulsion in an amount beyond what is required for the re-activation or rejuvenation, wherein the amount of maltene compounds beyond the amount required for the re-activation or rejuvenation reduces an amount of asphalt emulsion required to achieve a predetermined unconfined compressive strength and/or a predetermined Marshall Stability for the roadway material.

BRIEF DESCRIPTION OF THE DRAWINGS

The above and other objects, aspects, features, advantages and possible applications of the present innovation will be more apparent from the following more particular description thereof, presented in conjunction with the following drawings. Like reference numbers used in the drawings may identify like components.

FIG. 1 is a flow diagram illustrating use of an embodiment of a method disclosed herein to reduce the amount of asphalt emulsion that otherwise would be needed for a roadway material that does not need rejuvenation.

FIG. 2 is a flow diagram illustrating use of an embodiment of a method disclosed herein to reduce the amount of asphalt emulsion that otherwise would be needed for a roadway material that does need rejuvenation (or a component of which would need rejuvenation).

It should be noted that roadway materials that contain components in need of rejuvenation (FIG. 2) will always require more added maltenes to achieve a reduction in required asphalt emulsion binder than roadway materials that do not require rejuvenation (FIG. 1). This is because roadway materials that require rejuvenation will "soak up" some portion of the added maltenes (i.e., they will use the maltenes to "rejuvenate", which is known in the art); so an amount of maltenes must be added beyond what is required for rejuvenation. This has become known in the industry as the "High Yield Effect". A method to determine the amount of maltenes ("rejuvenator") needed to be added to oxidized asphalt is known to the industry, and will be discussed herein.

DETAILED DESCRIPTION OF THE INVENTION

Disclosed herein are novel formulations for, and methods of making and using recycled and/or stabilized roadway materials utilizing an additive for reducing the amount of asphalt emulsion needed compared to existing methods and compositions known in the art for recycling and stabilizing roadway materials to achieve equal or improved production, quality, and performance of said recycled and stabilized roadway materials.

The numerous innovative teachings of the present invention will be described with particular reference to several embodiments (by way of example, and not of limitation).

Disclosed herein are compositions and approaches utilizing maltenes for lowering the amount of asphalt emulsion it takes to recycle and/or stabilize roadway materials, including not just RAP, but also RAP/base mixtures (a process usually referred to as Full-depth Reclamation (FDR)) and 100% percent crushed stone road base mixtures (i.e., not including RAP-100% crushed stone is most commonly stabilized with an FDR process or mixed in a pug mill). More specifically, the compositions and methods disclosed herein are directed towards the addition of maltene compounds to an asphalt emulsion used as a component of a road base mixture in order to reduce the amount of asphalt emulsion that would otherwise be needed to achieve a certain material property in a roadway material.

In addition, disclosed herein are compositions and approaches utilizing maltenes as an additive to rejuvenate reclaimed asphaltic roadway materials during their recycling—that is, make the reclaimed asphaltic roadway materials usable again for a paving material or roadway maintenance material—and use maltenes beyond the amount needed for rejuvenation to reduce the amount of asphalt emulsion that would otherwise be needed to achieve a certain material property in a roadway material. It should be noted that the general use of maltenes to rejuvenate roadway material is known, but that the use of maltenes beyond their rejuvenation effect is not known.

Thus, the disclosed methods involving the use of maltenes can be used to: 1) reduce the amount of asphalt emulsion that would otherwise be needed to achieve a certain material property in a roadway material; or 2) rejuvenate roadway material but also reduce the amount of asphalt emulsion that would otherwise be needed to achieve a certain material property in a roadway material. In scenario 1), the roadway material does not need rejuvenation at all, but rather the use of maltenes reduces the amount of asphalt emulsion otherwise needed to achieve a certain material property (the "High Yield Effect"). In scenario 2), the roadway material is in need of rejuvenation so maltenes are used for such a purpose (which is known), but additional maltenes are used to reduce the amount of asphalt emulsion that would otherwise be needed to achieve a certain material property (also the High Yield Effect, but the effect is not realized until the amount of maltenes needed for rejuvenation is met, and an additional amount is added to produce the effect.).

Asphalt Emulsions

Asphalt emulsion is a compound that includes, at a minimum, asphalt cement, a surfactant or emulsifying agent, and water. Asphalt emulsions may be used to recycle, reclaim, and/or stabilize roadway materials. The goal of the inventive methods disclosed herein is to reduce the amount of asphalt emulsion required to recycle, reclaim, and/or stabilize roadway materials, and road bases in particular.

For given requirements, specifications, and/or applications of roadway materials, utilizing methods and approaches known in the art, a proper asphalt emulsion type and amount is identified. When the terms "emulsion" or "asphalt emulsion" are used, the broad category of emulsions for recycling and stabilizing roadway materials are encompassed. Examples of emulsions include, but are not limited to, CSS-1H, SS-1H, SS-1, and high float emulsions such as, but not limited to, CHFE-300, HFE-300, and HFE-300P.

Asphalt Cement

Asphalt cement is otherwise known as liquid asphalt cement or asphalt cement binder.

Road Base Material

Road Base material is the construction aggregate used to make the portion of the roadway that is immediately under the top surface, or "surface course". The term road base, or "base" materials are used to encompass virgin base materials such as (but not limited to) crushed stone aggregate base and also in situ road components such as existing base materials and asphalt cement concrete pavement surface course which has been reclaimed/recycled and incorporated into road base. It can also include previously reclaimed base roadway materials such as reclaimed asphalt pavements (RAP).

Asphalt Emulsion Reclaimed/Recycled/Stabilized Road Base Material

Asphalt emulsion reclaimed/recycled/stabilized road base (hereafter referred to as "stabilized base" material is made of a mixture of road base material, asphalt emulsion (e.g., CSS-1H, SS-1H, SS-1, etc.), water, and sometimes other additives, such as Portland cement or lime. Regulatory agencies require the stabilized base material to exhibit certain material properties, as outlined in the specification(s) of the agency. The goal of the inventive methods is to reduce the amount of asphalt emulsion required to produce a stabilized base material that exhibits these certain properties.

As noted above, the inventive methods disclosed herein provide for a process to reduce the amount of asphalt emulsion required to produce a stabilized road base material that exhibits these certain properties. In doing so, the inventor has also derived an inventive composition. The inventive composition is an asphalt emulsion. The asphalt emulsion is termed High Yield Emulsion. The High Yield Emulsion is an emulsion, such as CSS-1H, SS-1H, SS-1, etc., but it includes the addition of maltenes in sufficient quantities to produce the aforementioned "High Yield Effect".

As discussed above, use of maltenes to rejuvenate certain roadway materials is known. More specifically, maltenes are used to rejuvenate roadway materials that contains oxidized asphalt components. These roadway materials (typically RAP) may then be used as road base material. If a roadway material does not have oxidized asphalt components, there is no need for rejuvenation—i.e., there is no need to add maltenes according to conventional practice. In fact, one skilled in the art (prior to the present disclosure) would have been dissuaded from adding maltenes to such roadway material. Road base material that does not have oxidized asphalt components, or otherwise does not need rejuvenation, is typically referred to as "virgin" (in the case of new base material that has never been used), or "untreated" (in the case of an existing roadway that has a base layer that was not previously stabilized with a binder) base material. In fact, virgin and/or untreated base material has no asphalt. Thus, virgin base material is a term that is well known and used in the industry to identify a component of a roadway structure that has no asphalt. If there is no asphalt in the mix, then there is no need to re-activate or rejuvenate the mix—re-activation and rejuvenation are process techniques typically used to condition oxidized asphalt.

If a roadway material (including road bases into which RAP is being incorporated through a reclamation process) does have oxidized asphalt components, then it may be desirous to add maltenes for rejuvenation, but conventional wisdom dictates to not add maltenes beyond the need to rejuvenate. Yet, the inventive methods disclosed herein teach the use of maltenes beyond rejuvenation. The component of road base material that does have oxidized asphalt components, or otherwise may benefit from rejuvenation, is typically referred to as Reclaimed Asphalt Pavement (RAP). Conventional methods teach adding maltenes to replenish the maltenes lost due to oxidation because oxidized pre-existing bituminous material (e.g., RAP) will soak up the maltenes, leading to rejuvenation. Yet, when a pre-existing bituminous source is present in base roadway material and is treated in accordance with the inventive method, a greater maltene load (greater than is required for merely achieving rejuvenation) in the asphalt emulsion is necessary to achieve the desired effect of reducing overall needed asphalt emulsion content. This is because, as the oxidized pre-existing bituminous material soaks up the maltenes, there must be enough "free" maltene compounds to have the effect of reducing the overall asphalt emulsion needed to produce the desired strength properties of the roadway material. One method of determining the amount of rejuvenating agent needed to "rejuvenate" the oxidized asphalt is to recover (remove) it from the aggregate to which it is attached (if necessary), then add rejuvenating agent to the recovered asphalt until the asphalt has achieved a desired softness (called "penetration" or "pen"). The method for determining the pen of an asphalt is well known (e.g., AASHTO T 49). The asphalt is "rejuvenated" when it returns to the pen it had before it became oxidized, or generally between 40 and 80 Penetration, 77 deg. F, 100 g, 5 seconds. (See TXDOT Item 358, "Hot In-place Recycling Of Asphalt Concrete Surfaces", Table 1). It is not taught to rejuvenate asphalt beyond full rejuvenation, as it will lose its effectiveness as a binder. However, as is taught by the present invention, adding maltenes to an asphalt emulsion beyond the amount needed to rejuvenate any oxidized asphalt portion of a road mix will have the effect of lowering the amount of emulsion needed to stabilize the material.

The use of added maltenes to various commodity emulsions (e.g., CSS-1H, SS-1H, SS-1, etc.) has the effect of lowering the amount of asphalt emulsion needed to achieve a desired material strength for road base material which has been treated with the emulsion. Table 1, 2, and 3 illustrate, as examples and not limitations, various compositions and applications of the claimed invention. Asphalt emulsion compositions are shown and contrasted with the modification of maltenes added to the asphalt emulsion composition. The percentage of added maltenes reflects the weight as a percentage of the stock asphalt in the emulsion. Maltene addition may be added for example, and not limitation, by taking the stock asphalt and adding the maltenic base. In addition, the maltenic base or an emulsified maltene may be added into an asphalt emulsion. The percentage range of maltenes added may be in the range of about 0.5% to 100%.

Table 1 reflects the use of CSS-1H emulsion and shows the moisture conditioned Unconfined Compressive Strength (a common variant of UCS testing) of a roadway material made of 70% untreated base material and 30% RAP, at various emulsion contents. The data show that a standard CSS-1H type asphalt emulsion to which a maltenic load has been added (in this case, 6% maltenes by weight of the stock asphalt in the emulsion) can produce similar or better strengths than the standard emulsion even at contents reduced by around 50%. As with any mix design process, the method or process is to adjust the emulsion content to make the composition most effective (generally defined as the emulsion content that achieves the greatest strength, but sometimes defined as the lowest amount that will achieve a strength that achieves the minimum requirement of the specification). The present invention then directs that the mix design process then be repeated, but with adding maltenes to the emulsion at various rates to determine the maltenic load that results in the lowest needed emulsion (plus maltenes) content. The method of experimentation for determining the optimum maltenic load will be described herein. Mix design testing and testing of various emulsions will thus determine if the type and chemical makeup of any given emulsion will benefit from the addition of any maltenes regarding lowering the content needed of that type of emulsion to recycle or stabilize the road base materials.

TABLE 1

Moisture Conditioned Unconfined Compressive Strength (psi) of 70% base 30% reclaimed asphalt material at various emulsion contents. 120-150 psi is considered minimum standard

| Asphalt emulsion content by weight of road base materials | 5.00% | 4.50% | 4.00% | 2.50% | 2.20% | 2.00% |
|---|---|---|---|---|---|---|
| CSS-1H + 1% cement, no added maltenes | 126.6 | 138.9 | 127 | | | |
| CSS-1H + 1% cement + 6% added maltenes by weight of the stock asphalt in the emulsion | | | | 156.5 | 180.7 | 133 |

Note: The 1% cement is not a component of the asphalt emulsion, but is added to the road mix separately from the emulsion. Its inclusion is noted here to ensure that the only variable changed in the road mixture pertains to the type and amount of asphalt emulsion—that is, other additives were not used to make the lower emulsion content mix artificially stronger.

Table 2 shows test results for a roadway mix that is 100% virgin base material being used as the road base material with the added maltenes as compared to 100% virgin base material being used as the road base material without added maltenes. Table 2 reflects the use of CSS-1H emulsion and shows the unconfined compressive strength of 100% virgin base material at various emulsion contents. Illustrated here is that at for each emulsion percentage (6.30% and 3.00%), with the addition of the 3% maltenes to the composition (by weight of the stock asphalt, which is around 2% by weight of the whole emulsion), a higher unconfined compressive strength of the composition is achieved. A higher unconfined compressive strength is achieved at a lower asphalt emulsion content percentage of the composition when maltenes are added to the composition.

TABLE 2

Unconfined compressive strength (psi) of 100% virgin base material at various emulsion contents. 120-150 psi is considered minimum standard

| Emulsion content by weight of stabilized base roadway materials | 6.30% | 3.00% |
|---|---|---|
| CSS-1H + 3% added fly ash, no added maltenes | 163 | |
| CSS-1H + 3% added maltenes by weight of the stock asphalt in the emulsion | | 152 |

Table 3 reflects the Marshall stability of 100% RAP material at various emulsion contents. Again, illustrated here is that with the addition of maltenes to the composition, a higher unconfined compressive strength is achieved at a lower asphalt emulsion content percentage.

TABLE 3

Marshall stability (psi) of 100% reclaimed asphalt pavement (RAP) material at various emulsion contents. 1250 is considered minimum standard

| Emulsion content by weight of stabilized base roadway materials | 4.00% | 3.50% | 3.50% | 2.50% | 2.00% | 1.50% |
|---|---|---|---|---|---|---|
| CMS-2S, no added maltenes (does contain diesel fuel) | 1025 | 1260 | 1360 | 1550 | | |
| CSS-1H + 6% added maltenes by weight of the stock asphalt in the emulsion | | | | 1375 | 1550 | 1675 |

Tables 4-5 show material properties of roadway material made with CSS-1H emulsion (without the addition of maltenes) and "High Yield Emulsion" (with the addition of maltenes). The asphalt emulsion in the Tables is shown as a percent of the road base material. Portland cement is also used in tables 4-5. This is a common practice in designing stabilized road bases, but is not relevant to the invention. In Tables 4-5, the asphalt emulsion is mixed with 100% virgin base material to generate the stabilized road base material. Unconfined Compressive Strength (UCS) and Indirect Tensile Strength (IDT) tests were then performed on the road base material. As can be seen from Table 4, only the roadway material made with High Yield emulsion (having 2.6% asphalt emulsion and 1% Portland cement) exhibited a UCS and an IDT within Spec. (in this case, meeting the specifications of the Texas Department of Transportation ((TXDOT)). The best (as far as being close to Spec.) roadway material using CSS-1H is the one with 4.5% asphalt emulsion in Table 4 and the one with 3.8% asphalt emulsion in Table 5. In addition, Tables 4-5 show a clear correlation between use of maltenes beyond any type of rejuvenation effect and the reduction of asphalt emulsion required to achieve a higher UCS/IDT for the roadway material.

TABLE 4

| Emulsion Type | CSS-1H | CSS-1H | CSS-1H | High Yield | High Yield | High Yield | High Yield | High Yield | High Yield | High Yield | High Yield | Spec |
|---|---|---|---|---|---|---|---|---|---|---|---|---|
| Asphalt Emulsion % | 4 | 4.5 | 5 | 2 | 2.3 | 2.6 | 2 | 2.3 | 2.6 | 2.9 | 2.3 | |
| Portland Cement % | 1 | 1 | 1 | 1 | 1 | 1 | 0 | 0 | 0 | 0 | 1.5 | |
| Dry UCS | 99 | 100 | 94 | 201 | 124 | 220 | 119 | 121 | 115 | 95 | N/A | 150 |
| Wet UCS | 57 | 63 | 53 | 119 | 115 | 221 | 49 | 36 | 49 | 46 | N/A | 120 |
| Dry IDT | N/A | N/A | N/A | N/A | 38 | 58.5 | N/A | N/A | N/A | N/A | 46.8 | 50 |
| Wet IDT | N/A | N/A | N/A | N/A | 34 | 53.3 | N/A | N/A | N/A | N/A | 35.2 | 30 |

CSS-1H = emulsion made via conventional methods

High Yield = emulsion made via the inventive method

Portland cement = Dry Portland cement binder

UCS-Unconfined compressive Strength

IDT = Indirect Tensile Strength

Spec = The minimum requirement of UCS and IDT, per TXDOT spec.

TABLE 5

| Emulsion Type | CSS-1H | CSS-1H | CSS-1H | CSS-1H | CSS-1H | CSS-1H | High Yield | High Yield | High Yield | Spec |
|---|---|---|---|---|---|---|---|---|---|---|
| Asphalt Emulsion % | 3.8 | 3.8 | 4.3 | 4.3 | 4.8 | 4.8 | 2.2 | 2.5 | 2.8 | |
| Portland Cement % | 1 | 1.5 | 1 | 1.5 | 1 | 1.5 | 1 | 1 | 1 | |
| Dry UCS | 224.8 | 168.1 | 167.3 | 179.6 | 190.2 | 220.4 | 238.8 | 230.5 | 249.5 | 150 |
| Wet UCS | 114.8 | 74.7 | 94.4 | 90.3 | 100.9 | 112.9 | 108.6 | 117.9 | 110.3 | 120 |
| Dry IDT | 59.2 | 53.2 | 51 | 44 | 56.8 | 55 | 45.9 | 50.9 | 50.7 | 50 |

CSS-1H = a type of emulsion made via conventional methods
High Yield = a type of emulsion made via the inventive method
Portland cement = Dry Portland cement binder
UCS-Unconfined compressive Strength
IDT = Indirect Tensile Strength
Spec = The minimum requirement of UCS and IDT, per TXDOT spec.

As one skilled in art will appreciate, this drastically lowers the cost of roadway construction. That is, these compositions and methods improves the cost effectiveness of using asphalt emulsions to recycle or stabilize roadway materials by reducing the amount of asphalt emulsion needed in the process. In these examples, it is shown the addition of maltenic compounds to an asphalt emulsion reduces the overall amount of asphalt emulsion needed to perform a specific roadway recycling or stabilization task by 40-70%, however performance outside these ranges is achievable as well.

This approach and formulation/composition is in contrast to current technologies which concentrate on the appropriate type and amount of asphalt emulsion needed to perform a specific recycling or stabilization process, but not specifically on reducing the amount of asphalt emulsion needed for the process or composition.

The addition of maltenes to an asphalt emulsion to lower the needed asphalt emulsion content is applicable whether the emulsion is being used to recycle/reclaim 100% RAP, 100% virgin/untreated base material, or a mixture of the two.

In some embodiments, maltene treated emulsions may be diluted and the diluted product added at higher application rates. This still has the net effect of lowering the emulsion content.

Referring to FIG. 1, in an exemplary embodiment, a method of using maltene compounds involves determining a first amount of conventional asphalt emulsion required to add to a road base material to generate a mixture for roadway material, the roadway material exhibiting a predetermined unconfined compressive strength and/or a predetermined indirect tensile strength and/or a predetermined Marshall Stability. The base roadway material in this example will typically be virgin base material or untreated base material, or any combination thereof, but not RAP or similar material that would benefit from the rejuvenating properties of maltenes. The road base material will be absent of oxidized asphalt components.

The method can involve determining an amount of maltene compounds to be mixed with a second amount of asphalt emulsion so that a mixture of the second amount of asphalt emulsion and maltenes is used to generate roadway material exhibiting the predetermined unconfined compressive strength and/or indirect tensile strength and/or Marshall Stability. As noted above, use of maltene compounds can reduce the amount of asphalt emulsion that would otherwise be needed to achieve the predetermined unconfined compressive strength and/or indirect tensile strength and/or Marshall Stability for the roadway material composition. Thus, the second amount of asphalt emulsion is less than the first amount of asphalt emulsion. For example, the second amount of asphalt emulsion can be within a range from 40% to 70% less than the first asphalt emulsion amount. A process for determining the appropriate amount of maltenes to add to an emulsion to produce the "High Yield Effect" is as follows: first, determine the optimal amount of conventional emulsion to mix with the roadway material using conventional mix design methods (e.g., that achieves the strongest UCS or Marshall Stability). Once this is determined, create a second roadway mix using the same aggregate material, emulsion type, and other additives (water, cement) as the first "optimized" mix. However, for the second mix, add 1% maltenes by weight of the stock asphalt to the emulsion, and then add the emulsion (which now includes maltenes) to the mix at 50% of the optimum emulsion amount determined in the first mix, and perform strength testing that was used on the original optimized mix. Repeat this process, increasing the added maltenes to the emulsion in 1% increments (but keeping the overall emulsion content at 50% of the original determined optimum). The material will keep getting stronger as the level of maltenes is increased, up to a point, and then will begin to weaken (establishing a similar "strength curve" is, in fact, the conventional method for determining the original optimized emulsion content above). Once the optimal maltenic load of the emulsion has been established using this method, then a new mix design can be performed using the new "High Yield" emulsion to optimize the overall emulsion content, which might be higher or lower than the 50% of optimum conventional emulsion used as a baseline, but will in any event be much lower than the original optimized content of conventional emulsion.

If the roadway material is not in need of rejuvenation (as in this first example), any amount of maltene compounds added to the roadway material mixture would be contrary to conventional techniques, as conventional techniques do not teach to add any maltenes in such scenarios. If the roadway material is in need of rejuvenation (e.g., the roadway material contains some amount of RAP—the second example below), the addition of maltene compounds up until the point of optimal rejuvenation is taught by conventional techniques (as described in paragraph 41), but the addition of maltene compounds beyond that is not taught by conventional techniques; or, at the very least, there was not seen to be a need to add maltenes beyond the point of rejuvenation until the present disclosure.

Routine experimentation (e.g., performing published mix design testing to determine optimum binder (in this case asphalt emulsion)) content, along with the methodology described in paragraph 52, can be used to determine the amount of maltene compounds and the second amount of asphalt emulsion that would result in producing a roadway material exhibiting the desired specifications. It is well within the realm of routine experimentation for a skilled artisan to add maltenes to a standard emulsion (e.g., CSS-1H) to produce a High Yield Emulsion by following the methods disclosed by the present disclosure along with the known and existing mix design methodology. Known mix design methodology prescribes adding various amounts of asphalt emulsion to produce a curve to determine maximum achievable strength for a roadway material. The present disclosure demonstrates that the addition of maltene compounds can reduce the amount of asphalt emulsion that would otherwise be needed. From reading the present disclosure, a skilled artisan would understand that there could be a multitude of maltene percentages (for the added maltenes that would result in a reduced amount of emulsion) that can be used, and that it would be impracticable to disclose all of them. The specific maltene amounts would depend on the type of emulsion used, the type and quality of the components in the mixture, and design criteria. The inventive concept is the use of maltenes beyond their rejuvenation effect and for the purpose of reducing the amount of asphalt emulsion that would otherwise be needed to generate a roadway material exhibiting a desired material property. It is well within the skill of one who makes, uses, and conditions roadway material to perform routine experimentation (with the benefit of this disclosure) to determine an acceptable level of maltenes that will achieve the desired reduction of emulsions and the desired material properties of the roadway material.

The present disclosure does not provide explicit first or second amounts of asphalt emulsions as exemplars, but one skilled in the art would be able to quickly ascertain these. The first asphalt emulsion amounts can be easily determined by following the testing methodology of material specifications promulgated by regulatory agencies (e.g., Texas Department of Transportation). The optimum maltenic load and second asphalt emulsion amounts would have to be determined by experimentation as described in paragraph 52, which is routine. As noted above, providing all of the maltene/second emulsion amounts would be impracticable, but they can be determined with relative ease using the techniques described in this disclosure.

While a multitude of mix combinations can be derived, some examples include:
1. The second amount of asphalt emulsion is 3.00% or less by weight of the road base material; the maltene compounds are at least 3.00% by weight of an amount of stock asphalt in the second asphalt emulsion; and the predetermined unconfined compressive strength of the roadway material composition with the second amount of asphalt emulsion is at least 150 pounds per square inch.

Referring to FIG. 2, in another example, a method of using maltene compounds involves determining a first amount of asphalt emulsion required to add to a road base material to generate a mixture for roadway material, the roadway material exhibiting predetermined unconfined compressive strength and/or a predetermined Marshall Stability. The road base material in this example comprises road base material that will be re-activated or rejuvenated by maltene compounds (e.g., the road base material includes some RAP). The method involves determining an amount of maltene compounds to be mixed with a second amount of asphalt emulsion so that a second emulsion is produced. The amount of maltenes added to the second emulsion will have been predetermined through use of "penetration" testing described in paragraph 41. This second emulsion is then used for baseline testing, and is analogous to the "first" emulsion described in paragraph 52. In the case of roadway material that requires rejuvenation, after the amount of maltenes needed for rejuvenation is determined, then that amount of maltenes will be added to the asphalt emulsion at a rate that, when the asphalt emulsion is added to the road mix, an appropriate amount of maltenes will be delivered (for example, a roadway material that has 30% RAP will require more maltenes for rejuvenation than one that is 20%, RAP, and one that is 40% RAP will require more maltenes for rejuvenation than one that is 30% RAP, etc.). This will always be an approximate number, as conventional mix design testing calls for varying the emulsion content of the mix in order to determine the optimum. However, the common methods of determining allow for a range of acceptable results (e.g., the "40-80 pen" described in paragraph 41). The second emulsion will then be used to determine a baseline optimum emulsion content by mixing the "rejuvenating" emulsion with roadway material at various contents using standard mix deign methods. A third emulsion will then be produced using the process used to produce the second emulsion described in paragraph 52: by adding additional maltenes (in addition to the ones already added) to the second emulsion at 1% increments to make a third emulsion, performing mix design testing on the road mix that has been treated with each additional increment, but only adding 50% of the second, or "optimized" emulsion amount to the mix, until a new optimum maltenic load has been determined. Then additional testing can be performed which varies the overall emulsion content to find the optimum, creating the third "High Yield Emulsion".

Again routine experimentation can be used to determine the amount of maltene compounds needed to be added to the emulsions, and the overall emulsion amounts, for both the second and third asphalt emulsions. Some examples include:
1. The third amount of asphalt emulsion is within a range from 40% to 70% less than the first amount of asphalt emulsion (it will also be less than the second amount of emulsion, which is rejuvenating some of the oxidized asphalt in the mix, but the reduction in emulsion from the second to the third emulsion content will almost always be less than the reduction in emulsion from the first to the third).
2. The third amount of asphalt emulsion is 2.50% or less by weight of the road base material; the maltene compounds added to the third amount of asphalt emulsion are at least 6.00% by weight of an amount of asphalt stock in the first amount of asphalt emulsion; and the predetermined unconfined compressive strength of the roadway material composition with the second amount of asphalt emulsion is at least 150 pounds per square inch.
3. The maltene compounds are 6.00% or greater by weight of the third amount of asphalt emulsion.
4. The maltene compounds are within a range from 5.00% to 8.00% by weight of the third amount of asphalt emulsion.

In any event, a user would first determine the amount of maltene compounds to add to a standard asphalt emulsion (e.g., amount of maltene compounds to add to CSS-1H) to generate a desired High Yield Emulsion. The High Yield emulsion is then used in lieu of the standard asphalt emulsion. The user would then determine the amount of High Yield emulsion needed to add to the road base material so as to generate a roadway material exhibiting a desired unconfined compressive strength, indirect tensile strength, and/or Marshall Stability. The amount of maltene compounds needed to generate the High Yield emulsion and the amount of High Yield emulsion to add to the road base material can be determined from applicant's disclosure and known mix design methodology.

Maltenes as a Rejuvenator Vs. Maltenes as a Reducer of Asphalt Emulsion

Use of maltenes as a rejuvenator is different from use of maltenes as a reducer of amount of asphalt emulsion needed to treat roadway material. As noted above, it is well known to use maltenes as a rejuvenator, and that the proper use of a rejuvenator can allow for an adjustment of components in a roadway mix (e.g., adjustment of the proportions of new asphalt, cutback, or emulsion). However, use of maltenes as a rejuvenator is fundamentally different from using maltenes to reduce the otherwise required amount of asphalt emulsions needed to generate a roadway material having a predetermined material property.

It is important to note that using maltenes as a rejuvenator allows for oxidized pre-existing bituminous material (e.g., asphalt) to soak up the maltenes, thereby leading to the rejuvenation effect. It is also noted (albeit mostly anecdotally) in the literature that using maltenes to rejuvenate old asphalt can have the effect of lowering the amount of new binder required to stabilize certain roadway materials. However, the present disclosure teaches that even further reductions in binder required to stabilize a material that needs rejuvenation are possible if maltenes are added to an emulsion beyond the amount required for rejuvenation. When added in amounts beyond their rejuvenative qualities, maltenes in (for example) RAP will produce the same "High Yield Effect" as they do when added to emulsions used to treat roadway materials that do not require rejuvenation. Furthermore, if a roadway structure has no asphalt (e.g., 100% virgin base material) then there would be no need to rejuvenate, and thus no reason to add maltenes. In other words, the existing methods of using maltenes as a rejuvenator provide no guidance to one skilled in the art to use maltenes for reducing the amount of asphalt emulsion otherwise needed to generate a roadway material exhibiting a predetermined material property.

As noted earlier, it is well known that the proper use of a rejuvenator can allow for an adjustment of components in a roadway mix (e.g., adjustment of the proportions of new asphalt, cutback, or emulation). Using maltenes as a rejuvenator may reduce the proportion of asphalt emulsion needed for the mix, but this reduction is insignificant relative to the amount of asphalt emulsion that can be reduced when maltenes are used beyond their rejuvenating effect. For instance, use of maltenes beyond their rejuvenation effect can reduce the amount of asphalt emulsion needed by ½ or more (see Tables 1-5, for example). If maltenes are only used for their rejuvenation effect, the amount of asphalt emulsions needed would never be reduced by ½.

In brief, the invention is directed to formulations for, and methods of making and using roadway materials through the use of an additive for reducing the amount of asphalt emulsion needed compared to existing methods and compositions known in the art for recycling and stabilizing roadway materials to achieve equal or improved production, quality, and performance of said recycled and stabilized roadway materials.

The disclosed compositions and method are generally described, with examples incorporated as particular embodiments of the invention and to demonstrate the practice and advantages thereof. It is understood that the examples are given by way of illustration and are not intended to limit the specification or the claims in any manner.

To facilitate the understanding of this invention, a number of terms may be defined below. Terms defined herein have meanings as commonly understood by a person of ordinary skill in the areas relevant to the present invention. Terms such as "a", "an", and "the" are not intended to refer to only a singular entity, but include the general class of which a specific example may be used for illustration. The terminology herein is used to describe specific embodiments of the invention, but their usage does not delimit the disclosed formulations, compositions, and/or methods of use, except as may be outlined in the claims.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific systems and methods described herein. Such equivalents are considered to be within the scope of this invention and are covered by the claims.

All publications, references, patents, and patent applications mentioned in the specification are indicative of the level of those skilled in the art to which this invention pertains. All publications, references, patents, and patent application are herein incorporated by reference to the same extent as if each individual publication, reference, patent, or patent application was specifically and individually indicated to be incorporated by reference.

In the claims, all transitional phrases such as "comprising," "including," "carrying," "having," "containing," "involving," and the like are to be understood to be open-ended, i.e., to mean including but not limited to. Only the transitional phrases "consisting of" and "consisting essentially of," respectively, shall be closed or semi-closed transitional phrases.

The formulations, compositions, and/or methods of use disclosed and claimed herein can be made and executed without undue experimentation in light of the present disclosure. While the compositions, formulations, and methods of this invention have been described in terms of preferred embodiments, it will be apparent to those skilled in the art that variations may be applied to the formulations, compositions, and/or methods in the steps or in the sequence of steps of the method described herein without departing from the concept, spirit, and scope of the invention.

More specifically, it will be apparent that certain components, which are both shape and material related, may be substituted for the components described herein while the same or similar results would be achieved. All such similar substitutes and modifications apparent to those skilled in the art are deemed to be within the spirit, scope, and concept of the invention as defined by the appended claims.

What is claimed is:

1. A method of using maltene compounds, the method comprising:

either:

determining a first amount of asphalt emulsion required to add to a road base material to generate a mixture for roadway material so that the roadway material will exhibit a predetermined strength, the road base material consisting of components that will not be re-activated or rejuvenated by maltene compounds;

or adding a first amount of asphalt emulsion to a road base material to generate a mixture for roadway material and determining a strength for the mixture, the road base material consisting of components that will not be re-activated or rejuvenated by maltene compounds;

determining an amount of maltene compounds to be mixed with a second amount of asphalt emulsion so that a mixture of the second amount of asphalt emulsion and the amount of maltene compounds used to generate roadway material will exhibit the predetermined strength or the strength, the second amount of asphalt emulsion being less than the first amount of asphalt emulsion; and generating a mixture comprising the second amount of asphalt emulsion, the amount of maltene compounds, and the road base material.

2. The method of claim 1, wherein the second amount of asphalt emulsion is within a range from 40% to 70% less than the first asphalt emulsion amount.

3. The method of claim 1, wherein:

the second amount of asphalt emulsion is 3.00% or less by weight of the roadway material;

the maltene compounds are at least 3.00% by weight of the amount of stock asphalt in the second asphalt emulsion; and the predetermined strength or the strength is measured via unconfined compressive strength of the roadway material, wherein the predetermined unconfined compressive strength or the unconfined compressive strength of the roadway material with the second amount of asphalt emulsion is at least 150 pounds per square inch.

4. The method of claim 1, wherein:

the predetermined strength or the strength is measured via unconfined compressive strength and/or Marshall Stability.

* * * * *